United States Patent [19]
Tracy

[11] Patent Number: 6,149,101
[45] Date of Patent: Nov. 21, 2000

[54] AIRCRAFT WING AND FUSELAGE CONTOURS

[76] Inventor: Richard R. Tracy, 3000 Old Ranch Rd., Carson City, Nev. 89704

[21] Appl. No.: 09/270,524

[22] Filed: Mar. 17, 1999

Related U.S. Application Data

[63] Continuation-in-part of application No. 08/650,686, May 20, 1996, Pat. No. 5,897,076, which is a continuation-in-part of application No. 08/258,781, Jun. 13, 1994, Pat. No. 5,518,204, which is a continuation of application No. 08/013,065, Feb. 3, 1993, Pat. No. 5,322,242, which is a continuation of application No. 07/726,936, Jul. 8, 1991, abandoned.

[51] Int. Cl.[7] ............................................. B64C 1/38
[52] U.S. Cl. .......................... 244/130; 244/36; 244/35 R; 244/204; 244/45 R
[58] Field of Search ........................... 244/130, 36, 35 A, 244/35 R, 204, 45 R, 218

[56] References Cited

U.S. PATENT DOCUMENTS

| | | | |
|---|---|---|---|
| D. 172,588 | 7/1954 | Fleming et al. | D71/1 |
| D. 179,348 | 12/1956 | Johnson | D71/1 |
| D. 186,962 | 12/1959 | Kux | D71/1 |
| D. 204,108 | 3/1966 | Peterson | 71/1 |
| D. 266,161 | 9/1982 | Rosenthal | D12/332 |
| D. 295,037 | 4/1988 | Stalony-Dobrzanski et al. | D12/342 |
| 2,709,052 | 5/1955 | Berg | 244/35 |
| 2,912,190 | 11/1959 | Mac Donough | 244/44 |
| 2,997,256 | 8/1961 | Walker | 244/15 |
| 3,093,350 | 6/1963 | Wilkins | 244/42 |
| 3,952,971 | 4/1976 | Whitcomb | 244/35 R |
| 4,828,204 | 5/1989 | Friebel | 244/15 |
| 5,000,400 | 3/1991 | Stuhr | 244/102 R |
| 5,322,242 | 6/1994 | Tracy | 244/36 |
| 5,518,204 | 5/1996 | Tracy | 244/36 |
| 5,740,991 | 4/1998 | Gleine et al. | 244/203 |
| 5,899,413 | 5/1999 | Hager et al. | 244/130 |
| 5,992,796 | 11/1999 | Smith | 244/45 A |

FOREIGN PATENT DOCUMENTS 3727608  3/1989  Germany.

OTHER PUBLICATIONS

J. M. H. van Vlaenderen, "De F–104 'Starfighter'", De Ingenieur, Mar. 3, 1961, pp. L9–L14.

(List continued on next page.)

*Primary Examiner*—J. Woodrow Eldred
*Attorney, Agent, or Firm*—William W. Haefliger

[57] ABSTRACT

A wing in combination with a fuselage having a body which is elongated in the direction of flight, the wing having physical parameters [comprising a wing having a relatively unswept and sharp leading edge, smooth convex chordwise contour over a majority of its surface from the leading edge, and a thickness to chord ratio of about 2% or less as a spanwise average, beyond a spanwise distance from the fuselage centerline of not more than about $C/2\beta$ on each side of the body, where $\beta=\sqrt{M^2-1}$, M=cruise Mach number, C=wing chord at centerline, and wherein the thickness to chord ratio over the above referenced spanwise distance is increased substantially over 2%,] to benefit strength, stiffness, weight, interior volume, and laminar boundary layer stability, and limited only by the extent to which the increase in volume drag which would otherwise occur is substantially eliminated by the body having indentation proximate the wing, the wing thickening and body indentation being characterized by one of the following:

a) selection of a wing planform airfoil and thickness distribution, the fuselage then indented to minimize or reduce the combined volume wave drag, or optimize a design figure of merit, b) selection of a fuselage longitudinal distribution of cross section areas, the wing thickness then distributed spanwise so as to reduce the combined volume wave drag, or optimize a design figure of merit, c) reduction of drag, or optimization of other figure of merit such as weight or cost, in accordance with variation in both the fuselage longitudinal distribution of cross section area and wing planform airfoil and spanwise thickness distribution.

17 Claims, 9 Drawing Sheets

OTHER PUBLICATIONS

John D. Anderson, Jr., "Fundamentals of Aerodynamics", 1984, pp. 370–372.

Francis J. Hale, Introduction to Aircraft Performance, Selection, and Design, 1984, pp. 14–17.

"Shape of Wings to Come . . . ", *Flight*, Sep. 26, 1952, p. 410, Issue 2279, vol. LXII.

"Wing Structures of Future Aircraft", Aircraft Engineering, vol. XXV pp. 128–129, No. 291.

Clement J. Welsh et al., Research Memorandum—"Effects of Some Leading–Edge Modifications, Section and Plan–Form Variations, and Vertical Position on Low–Lift Wing Drag at Transonic and Supersonic Speeds", National Advisory Committee for Aeronautics, Jan. 18, 1955.

John G. McTigue et al., "Two Techniques for Detecting Boundary–Layer Transition in Flight at Supersonic Speeds and at Altitudes Above 20,000 Feet", 1959.

Dennis M. Bushnell, "Supersonic Aircraft Drag Reduction", AIAA Paper 90–1596, 1990.

F. J. Chen et al., "Comparison of Boundary Layer Transition on a Cone and Flat Plate at Mach 3.5", 1988 AIAA–88–0411.

R. D. Wagner et al., "Supersonic Laminar Flow Control On Commercial Tranports", NASA Langley Research Center, 1990.

"Research in Natural Laminar Flow and Laminar–Flow Control", NASA Conference Publication 2487, Part 3, 1987.

D. Kuchemann, FRS, The Aerodynamic Design of Aircraft, p. 73, 1978.

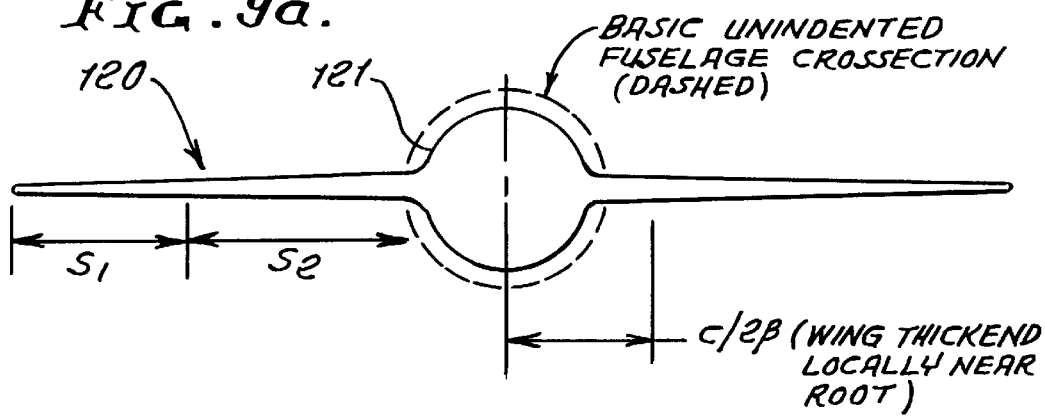
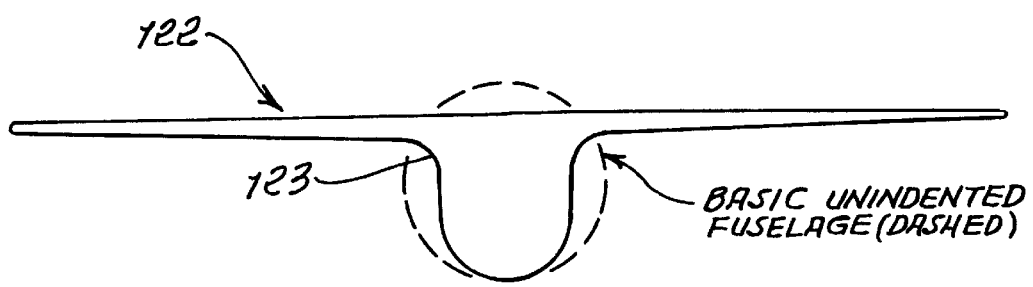
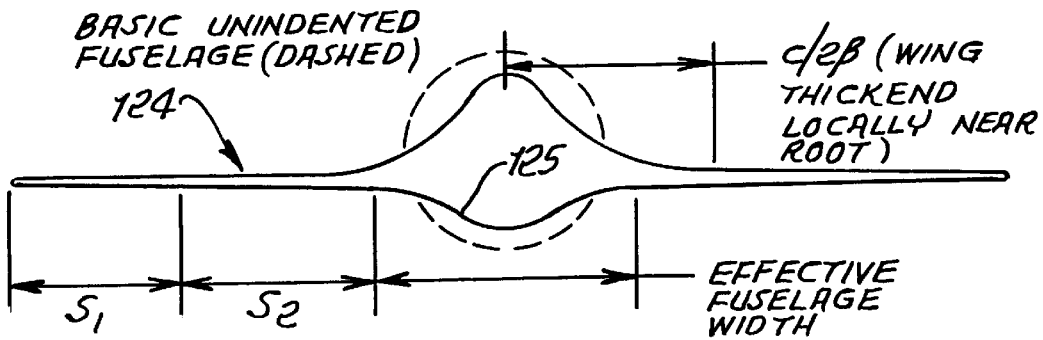

AIRCRAFT WING AND FUSELAGE CONTOURS

This application is a continuation-in-part of prior U.S. patent application Ser. No. 08/650,686 filed May 20, 1996, now U.S. Pat. No. 5,897,076, which is a continuation-in-part of prior U.S. patent application Ser. No. 08/258,781 filed Jun. 13, 1994, now U.S. Pat. No. 5,518,204, which is a continuation of prior U.S. patent application Ser. No. 08/013,065 filed Feb. 3, 1993, now U.S. Pat. No. 5,322,242, which is a continuation of prior U.S. patent application Ser. No. 07/726,936 filed Jul. 8, 1991, now abandoned.

BACKGROUND OF THE INVENTION

This invention relates generally to long-range, supersonic cruise aircraft, and improvements in the wings of such aircraft.

Supersonic transports (SSTs) have been proposed in the past; however, swept-back wings of such aircraft have introduced inefficiencies, due to high skin friction development resulting from the turbulent boundary layer air flow associated with such highly swept wings. This skin friction drag contributes to undesirably high fuel consumption, and results in concomitant high operating expense and short range. Furthermore, the high sweep and short span of such wings results in very inefficient subsonic flight and poor takeoff and landing performance.

Accordingly, the main obstacle to widespread acceptance of the supersonic transport is its relatively poor range and fuel efficiency, resulting in uncompetitive economics. The basic cause of this uncompetitive performance is the low lift to drag ratio (L/D) of presently used and proposed SSTs, at both supersonic and subsonic speeds.

For more than three decades, the aeronautical community has tried to improve the L/D (lift-to-drag ratio) of long-range, supersonic military and civil aircraft designs. Despite these efforts, the gains have been marginal and in the case of SST's far from the 30%-plus improvement in cruise L/D needed to approach the range and operating economics of subsonic transports. All of the aerospace industry-proposed SST designs are based on modifications of the delta wing (a point-forward triangle). The reason for this choice is that the modified delta wing (and other highly swept forms) has been shown theoretically to have lower supersonic drag due to lift, than a wing planform with relatively low sweep, and also lower wave drag due to thickness. In consequence, the delta wing can be thicker, thus reducing structural weight and providing more volume for fuel and equipment.

The delta wing family also has recognized disadvantages; and because it has been the sole candidate for SSTs, these disadvantages are widely assumed to be unavoidable for all SSTs. Two of these disadvantages are the delta wing's high drag due to lift at subsonic speed, and low maximum lift, even at an uncomfortably high angle of attack. These traits lead to the need for high power and high speed during takeoff and landing, resulting in high noise levels and requiring long runways.

Previous disclosures described the design of wings for efficient supersonic flight, which have reduced skin friction drag resulting from design features which maintain a laminar boundary layer over a majority of their external (wetted) surface. Such a wing necessarily has a relatively unswept leading edge and a thin, sharp, convex airfoil for low drag and to limit boundary layer cross-flows, which otherwise would destabilize the laminar boundary layer. The airfoil must also be thin enough that the wave drag caused by thickness (volume drag) is not much greater than the skin friction drag, otherwise the friction drag reduction achieved by the laminar boundary layer would be obviated by the volume wave drag. Accordingly, it can be shown that the average thickness must be less than about 2% of the local wing chord to realize the substantial drag reduction of a laminar wing compared to a conventional delta-type supersonic wing.

It is known that in supersonic flight, a wing and fuselage can have a significant influence on each other, including the possibility of a reduction in total volume wave drag compared to the sum of the drag of each separately. One well-known example is the so-called area rule, where the fuselage is indented in such a way as to partially offset the volume drag of the wing. Methods for designing the indentation are generally known, however the drag reduction benefits for an unswept wing have been hither to generally much less than for a swept or delta wing, except for cruise at near the speed of sound (Mach 1). This result of only limited wing-body volume drag reduction by means of body indentation for supersonic cruise speeds is a significant disadvantage for the unswept wing compared to a typical delta wing and is the reason that for an unswept wing the average thickness to chord ratio must be kept relatively small to realize the improved lift to drag ratio of the present invention.

However, if the wing thickness is treated as a variable parameter to be optimized along its span, just as the body cross sectional area is treated as a variable to be optimized along its length in present design practice, new and advantageous result occurs for an unswept wing. In this case, a substantial fraction of the wing volume drag arising on the inboard portion of the wing can be cancelled by body indentation, even up to relatively high supersonic Mach number (rather than only near Mach one). Thus, since the major benefits of increasing wing thickness arise near the root, a relatively large root thickness can be provided without a correspondingly severe drag penalty, by local shaping of the body. The following benefits can result from local thickening at the wing root: increases in bending and torsional strength and stiffness, fuel volume, space for actuators and mechanisms, extent of laminar flow caused by the stronger favorable pressure gradients combined with lower cross-flow for a given sweep and taper.

SUMMARY OF THE INVENTION

It is a major object of the present invention to provide wing and fuselage configurations which provide the benefits referred to above. This objective is met by provision of a supersonic aircraft fuselage and wing characterized by the following:

a) said wing having a relatively low sweep sharp leading edge, and a chordwise extending surface, said surface having a smooth convex chordwise contour over a majority of said surface, b) said wing having thickness dimension to chordwise dimension ratios R, or T which are:
  i) about 2% or less as a spanwise average value, over a first spanwise extent $S_1$ of the wing,
  ii) in excess of 2% as a spanwise average value over a second spanwise extent $S_2$ of the wing, where $S_2$ extends to an intermediate region spanwise along the wing, and $S_1$ extends from near the wing tip to said intermediate region, $S_2$ having value from the center of the fuselage of about $C/2\beta$, where:
    C=wing chord at the centerline, as defined herein $\beta = \sqrt{M^{2-1}}$ M=cruise Mach number, c) and wherein said ratios R over said $S_2$ spanwise extent, are sufficient to provide at least one of the following as an improvement over ratios of about 2% or less:

$x_1$) increased wing strength
$x_2$) increased wing stiffness
$x_3$) reduced wing weight
$x_4$) increased wing interior volume
$x_5$) enhanced air flow laminar boundary layer stability, over the wing d) and wherein said fuselage has reduced cross-section area indentation distributed along the intersection of the wing and fuselage, to provide reduced volume wave drag attributable to the fuselage and wing at the design supersonic cruise Mach number.

In the process of achieving the stated objectives, such wing spanwise variation of thickness and fuselage indentation are typically met by one of the following:

a) selection of a wing planform, airfoil and spanwise thickness distribution, the fuselage then indented to reduce the combined volume wave drag so as to optimize a figure of merit such as weight or cost, such optimization typically subject to design constraints, b) selection of a fuselage longitudinal distribution of cross section areas, the wing thickness then distributed spanwise so as to optimize the figure of merit, c) variation in both the fuselage longitudinal distribution of cross section area and wing spanwise thickness distribution so as to optimize the figure of merit, which is preferred.

A further object is to provide the stated ratios R over said $S_2$ spanwise extent, wherein two or more and preferably all of $x_1$), $x_2$), $x_3$), $x_4$) and $x_5$) may be provided.

Yet another object is to provide a method of achieving the desired related wing and fuselage configuration, which includes the steps:

$y_1$) selecting a wing planform and airfoil, and
$y_2$) adjusting said airfoil thickness and fuselage indentation to optimize said figure of merit.

In effect, the method may include the steps which may be iteratively repeated until the figure of merit is optimized:

$y_1'$) distributing the wing thickness spanwise over said $S_2$ spanwise extent, in relation to said areas said said wing thickness values selected to provide thickness to chord ratios substantially in excess of 2%.

$y_2'$) selecting a lengthwise distribution of fuselage cross-section areas in upright planes which intersect said indentation, so as to achieve at least one of the following:
i) reduction in said drag,
ii) reduction in wing and fuselage overall weight
iii) reduction in fuel consumption over a specified range.

A yet additional object is to provide an aircraft wing and fuselage comprising:

a) said fuselage having indentation along the wing side thereof, and lengthwise of the fuselage,
b) said wing having maximum thickness extending spanwise, said maximum thickness decreasing from a primary wing zone proximate the fuselage indentation to a secondary wing zone at a selected distance from the fuselage centerline,
c) said maximum thickness to chord ratio, t/c' typically remaining less than about 2% from said secondary zone to the wing tip, wherein C'=local wing chord
t=corresponding maximum airfoil thickness.

The selected distance is typically about $C/2\beta$ where:
C=wing chord at centerline
$\beta = \sqrt{M^{2-1}}$
M=cruise Mach number.

Accordingly, an unswept wing-body designed according to the present invention can have local thickness ratios of up to about 4% for the critical wing root region without a significant volume drag penalty, as long as the remainder of the wing has less than about 2% local thickness ratio. This result can be achieved by optimizing the spanwise distribution of wing thickness jointly with the longitudinal distribution of body cross section area. The region in which wing thickness can substantially exceed approximately 2%, and still have its volume drag substantially cancelled by body shaping, extends a distance spanwise from the fuselage centerline of about $C/2\beta$ on each side ($\beta = \sqrt{M^{2-1}}$, C=wing chord at centerline, and M=cruise Mach number). Over this spanwise extent the thickness should decrease smoothly from a maximum value (e.g. 4%) at the body to near the value selected for the wing average thickness (e.g. 2%).

The key to the improved supersonic wing design is to facilitate and exploit the existence of a laminar boundary layer over most of the wing surface. Certain considerations must be recognized and taken into account in order to achieve these qualities, which result in a much different wing from the industry standby delta wing.

It is well known that at typical flight conditions, either subsonic or supersonic, the skin friction drag caused by a laminar boundary layer is a small fraction of the skin friction of a turbulent boundary layer. It is also known that boundary layer stability theory predicts that the laminar boundary layer is much more stable in resisting transition to turbulent boundary layer flow at supersonic speeds than at subsonic speeds. Until recently, there were no reliable quantitative test data supporting this prediction, and most wind tunnel tests gave conflicting or inconclusive results. Recently, tests at Mach 3.5 in low turbulence, or "quiet" wind tunnel, intended to provide a test of boundary layer stability theory, did closely confirm the theoretically predicted stability of the laminar boundary layer.

Employing stability theory, one can discern various influences on stability of the laminar boundary layer, such as the stabilizing effects of a favorable pressure gradient (pressure decrease in streamwise direction) and reduced skin temperature (up to Mach number of about 4); and one can discern that cross-flows in the boundary layer have a severe destabilizing effect and cause transition to turbulent flow at or near the leading edge of any highly swept wing.

According to prior disclosure in the above reference applications, and in order to achieve a substantial reduction of wing drag in supersonic flight, compared to any of the modified delta or other highly swept types of wing, three criteria must be satisfied:

1. The improved wing must be positioned and configured to maintain a laminar boundary layer over a majority of the wing chord (streamwise length).
2. The improved wing airfoil thickness and shape must be designed to limit the wave drag due to thickness to about the same magnitude as the drag due to skin friction.
3. The wing area must be such that wing loading (aircraft weight divided by total wing area) results in a lift coefficient at cruise which is close to optimum, that is, where the lift-dependent drag is half of the total aircraft drag (or about equal to the total zero-lift drag).

In accordance with the first criterion, the leading edges of the wing planform are sharp and are swept aft or forward at less than the Mach angle, in order to prevent local subsonic flow near the leading edge and associated strong crossflows, and the airfoil contour is such as to provide negative (or favorable) pressure gradient from leading to trailing edge to stabilize the laminar boundary layer. For a given design cruise condition, the minimum required stabilizing favorable pressure gradient and maximum permissible destabilizing crossflow can be determined from experiment or boundary layer stability theory; and the wing contour can be developed such that the pressure gradient and crossflow conditions are met or exceeded.

Under some circumstances, for example where, even with a favorable pressure gradient, the extent of the laminar boundary layer is appreciably less than the majority of the wing surface, as in the case of a large aircraft, such as a supersonic transport, it may be advantageous to further increase the laminar flow extent by cooling the wing skin below the adiabatic (or zero heat transfer) temperature.

During design and construction of the wing, the surface of the airfoil must be kept free of discontinuities and irregularities large enough to disturb the flow outside the boundary layer or to prematurely destabilize the laminar boundary layer. Finally, the wing is positioned relative to the fuselage and engine inlets such that no shock waves cross the wing, since they could alter the favorable gradient sufficiently to prematurely destabilize the boundary layer and cause transition to turbulent flow.

In accordance with the second criterion, the wing airfoil has a suitable supersonic profile, such as a sharp-edged, modified circular arc, and more important, it is extremely thin over the spanwise extent $S_1$. Under typical flight conditions, the average thickness-to-chord ratio over $S_1$ must be in the range of not more than about 2%. Somewhat greater thickness could be used, but since the thickness wave drag increases as the square of the thickness-to-chord ratio, substantial increase in thickness would largely offset the skin friction drag reduction due to the greater extent of laminar boundary layer coverage. As a result, the task is to design a wing which meets strength and stiffness requirements within the thickness limitations of the second criterion. The final selection of thickness for a given design will be the result of balancing the increased weight of a thinner wing against the associated drag reduction.

The third criterion is well known in aerodynamic theory as the condition for minimum drag with a given lift (or weight), as long as the lift-dependent drag varies as the square of the lift, which is approximately the case for most aircraft designed for efficient flight, whether at supersonic or subsonic speed. Aerodynamic theory also shows that the lift coefficient for this condition will be less for the improved wing, with laminar skin friction than for a typical delta wing with higher turbulent skin friction drag. Accordingly, the laminar wing can have either a lower wing loading or lower cruise altitude, or a combination of both, with resulting benefits of lower landing speed and reduced risk of ozone damage in the upper atmosphere.

The combination or use of the first two criteria has not previously been described in the aeronautical literature, prior to applicant's invention, nor reduced to practice with the intent of achieving substantial drag reduction in long-range supersonic aircraft, and such combination is important to the present invention.

Further, in accordance with the present invention, there are attainable combinations of thickness and laminarity for which a laminar flow wing configured according to the present invention has a calculated minimum drag, for a given lift, which is substantially lower than that found in tests of well-designed, modified delta wings.

It is a further major object of the invention to provide an improved supersonic cruise aircraft, such as an SST, with much improved efficiency, resulting in reduced fuel consumption and increased range at supersonic speeds. Basically, the improved aircraft has a suitably designed and indented fuselage, longitudinally extended in the direction of flight, and an improved wing, and is characterized by a) leading edge sharpness defined by upper and lower wing surfaces, which taper toward the leading edge to define an angle δ, closely proximate the leading edge at all spanwise locations, b) leading edge sweep angle, Ω, measured relative to a plane perpendicular to the longitudinal axis, c) the angle Ω and sharpness δ characterized in that at the design supersonic cruise flight conditions, the wing outer portion (spanwise extent $S_1$) has an attached shock wave, that is the forwardmost shock wave produced in association with the wing outer portion extends generally along or rearwardly of the leading edge, whereby laminar boundary layer conditions are maintained over the leading edge and adjacent the surface of the wing outer portion.

As will be seen, the angle Ω is typically between 0° and about 30°, so is not a radically swept-back wing. The wing typically has much reduced thickness, as compared with conventional wings, to the extent that the wing preferably does not carry the aircraft engine, or fuel for the engine, or fuel tanks, these being typically carried by the fuselage.

As will further be seen, the maximum limiting value of the angle Ω, as referred to, to satisfy the condition (c) above is typically defined as follows:

$$\Omega \leq \text{arc cosine } (1/M)$$

where ≦ means less than, or equal to, and:

M=Mach number associated with the design cruise speed in supersonic flight and, may be $M_L$, the lowest Mach number of the supersonic cruise flight envelope of the airplane.

It is another object of the invention to provide an improved wing for an efficient, long-range, supersonic aircraft having optimum weight, such that the ratio of maximum thickness-to-chord dimension would be greatest at the wing root and least at the wing tip, for example at the wing root, the ratio being less than about 4%, and at or proximate the wing tip, the ratio being less than about 1½, such that the average ratio is less than about 2% over a spanwise extent outboard of a wing region at a substantial distance from the wing root, i.e. the region $S_1$.

A further object is to provide an airfoil which has minimum combined drag, due to thickness and skin friction for a given thickness, achieved by varying the curvature relative to a parabolic (circular arc) airfoil, so as to delay transition from laminar to turbulent boundary layer flow to a location as far aft on the wing surface as possible, such delay resulting in less skin friction drag, and being sufficient to more than offset the greater wave drag of varying the curvature.

Under criteria a) and b) above, conditions conducive to extensive laminar boundary layer flow are maintained over the wing upper and lower surfaces from the leading edge to near the trailing edge of the wing surface at the design supersonic cruise speed of the aircraft. Also, the location of the wing leading edge should be inboard of the principal shock wave flaring rearwardly from the nose of the aircraft.

Within the scope of the present invention, the wing trailing edges may have some thickness, rather than being sharp, to reduce wave drag, and relieve some of the pressure rise at the trailing edge, as well as facilitate construction.

A further object includes the provision of flap means associated with the wing leading and trailing edges, and supported for downward deployment during subsonic flight, as during takeoff and landing of the aircraft. Such flap means typically extends lengthwise over the span of the wing leading and trailing edges. The flaps may also be used for more efficient cruise flight at subsonic speed, with reduced deflection. The leading edge flaps must be sufficiently free of gaps and steps when retracted in the supersonic cruise configuration to avoid prematurely destabilizing the laminar boundary layer, and preferably also when moderately deflected for subsonic cruise.

A further object includes maximizing the performance benefits from the reduced wing drag by also reducing the turbulent skin friction drag of other parts of the aircraft, such as the fuselage and engine nacelles, for example by configuring such parts for maximum practical extent of laminar flow, and by integrating them with the wing in advantageous ways, so as to reduce the amount of aircraft surface subject to turbulent skin friction, to the extent feasible. The principals for achieving extensive laminar flow on a slender body, such as the fuselage, are similar to those for the wing, namely, to use shapes which avoid large cross-flow and provide a favorable pressure gradient, and a surface sufficiently free from gaps and roughness. As in the case of the wing, surface cooling can be sued to increase laminar boundary layer stability and delay transition to turbulent flow.

These and other objects and advantages of the invention, as well as the details of an illustrative embodiment, will be more fully understood from the following specification and drawings, in which:

DRAWING DESCRIPTION

FIG. 4 is a larger graph version of FIG. 2, showing the relationship of wing local thickness ratio to fraction of wing semi-span, i.e. near the fuselage;

FIGS. 6a–6e are sections taken on lines 6a—6a-6e—6e of FIG. 6;

DETAILED DESCRIPTION

Figure 3:
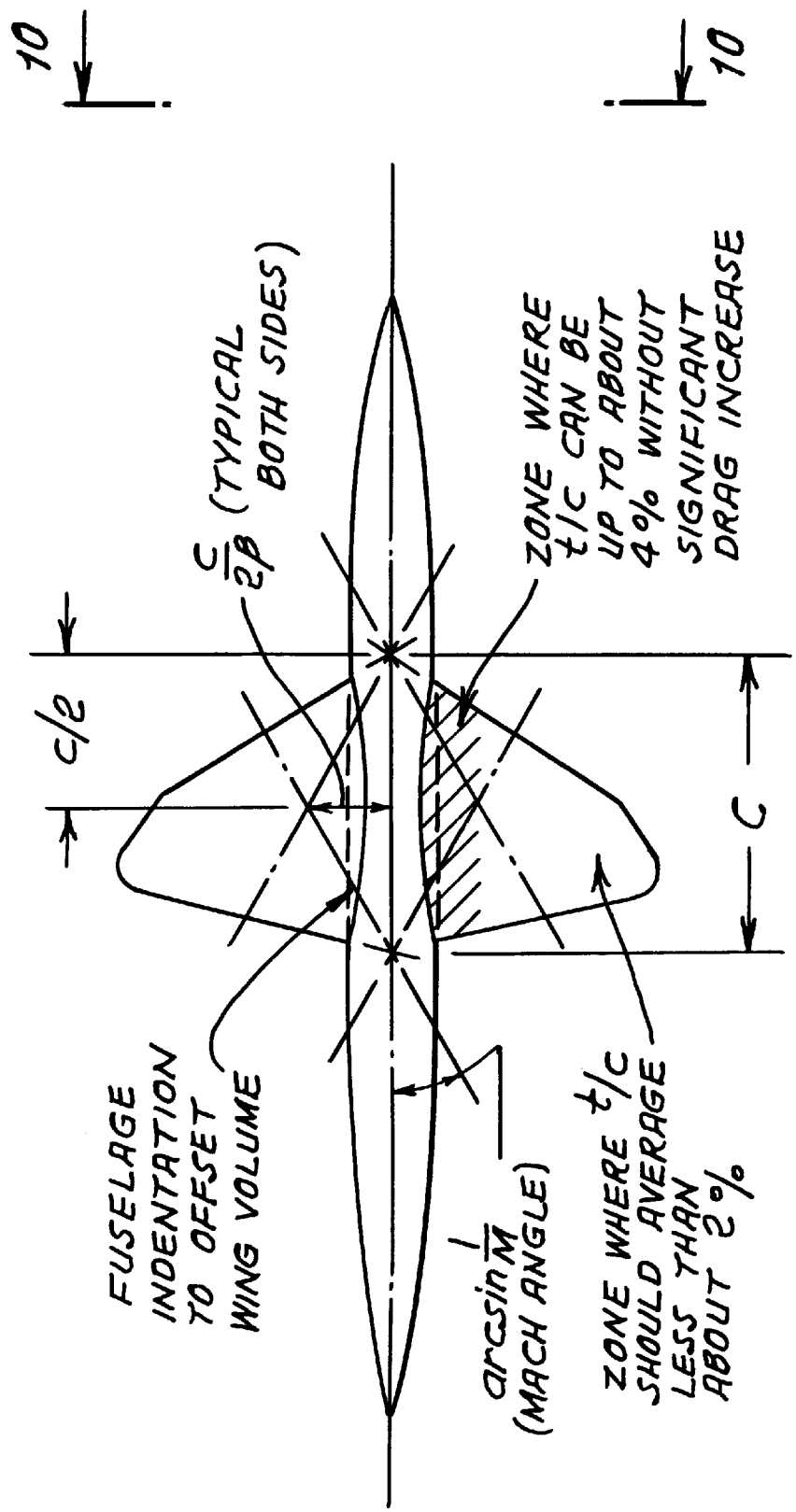
FIG. 3 is a plan view of the wing and body of a supersonic aircraft, showing fuselage side indentation as related to wing root configuration.
Figure 10:
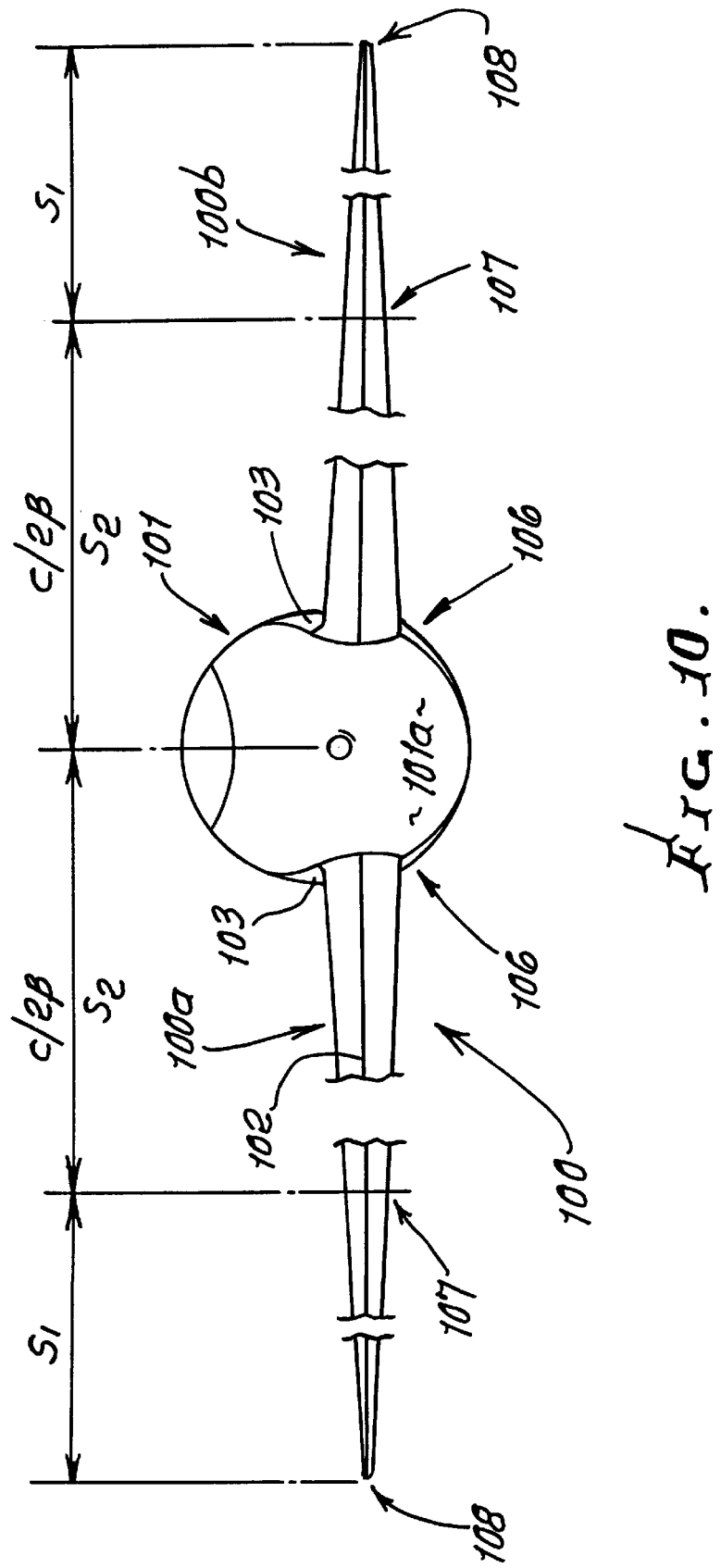
FIG. 10 is a frontal elevation taken on lines 10—10 of FIG. 3.

Referring first to FIGS. 3 and 10, a wing 100 is shown in combination with a fuselage 101 having a body 101a which is elongated in the direction of flight. The wing 100 has left and right sections 100a and 100b, each having a relatively unswept and sharp leading edge 102, a smooth convex chordwise contour over a majority of its surface from the leading edge, and a thickness to chord ratio of about 2% or less as a spanwise average, outboard of a spanwise distance of not more than about $C/2\beta$ on each side of the body centerline, where $\beta = \sqrt{M^{2-1}}$, M=cruise Mach number, C=centerline wing chord, defined as the distance between the leading and trailing edges of the wing planform extended to the fuselage centerline, as shown in FIG. 3. The thickness to chord ratio over that spanwise distance is increased substantially over 2%, to benefit strength, stiffness, weight, interior volume, and laminar boundary layer stability, and is limited only by the extent to which the increase in volume drag which would otherwise occur, is substantially eliminated by the body having indentation proximate the wing. See indentations at 103 proximate the wing roots. Wing thickening and body indentation are characterized by one of the following:

a) selection of a wing planform airfoil and thickness distribution, the fuselage then indented to reduce the combined volume wave drag, to optimize a figure of merit such as weight or cost, b) selection of a fuselage longitudinal distribution of cross section areas, the wing thickness then distributed spanwise so as to reduce the combined volume wave drag, to optimize a figure of merit, c) or preferably variation of both wing spanwise thickness distribution and fuselage longitudinal cross-section area to optimize a figure of merit.

Accordingly, each wing section 100a and 100b has airfoil maximum thickness to chordwise dimension ratios R which are:

i) about 2% or less as a spanwise average value, over a first spanwise extent $S_1$ of the wing, ii) in excess of 2% as a spanwise average value over a second spanwise extent $S_2$ of the wing, iii) where $S_2$ extends from near the fuselage to an intermediate region spanwise along the wing, and $S_1$ extends from near the wing tip to said intermediate region $S_2$ which is located not more than about $C/2\beta$ from the fuselage centerline, where:

C=wing chord, at fuselage centerline $\beta = \sqrt{M^{2-1}}$

M=cruise Mach number, c) and wherein said ratios R, over said $S_2$ spanwise extent, are sufficient to provide at least one of the following as an improvement over ratios of less than 2%:

$x_1$) increased wing strength $x_2$) increased wing stiffness $x_3$) reduced wing weight $x_4$) increased wing interior volume $x_5$) enhanced air flow laminar boundary layer stability, over the wing d) and the fuselage has reduced cross-section area indentation distributed along the intersection of the wing and fuselage, to provide reduced volume wave drag attributable to air flow over the fuselage and wing at the design supersonic cruise speed.

Typically, the ratios R, over said $S_2$ spanwise extent, are sufficient to provide at least two of $x_1$), $x_2$), $x_3$), $x_4$) and $x_5$) and preferably provide all of $x_1$), $x_2$), $x_3$), $x_4$) and $x_5$).

The method of providing the improved wing includes the steps:

$y_1$) selecting a wing planform and airfoil, and $y_2$) adjusting said airfoil thickness and indentation to optimize said figure of merit.

In effect, the method may include the steps which may be iteratively repeated:

$y_1'$) distributing the wing thickness spanwise over said $S_2$ spanwise extent, in relation to said areas, said wing thickness values selected to provide thickness to chord ratios substantially in excess of 2%, $y_2'$) selecting a lengthwise distribution of fuselage cross-section areas in upright planes which intersect said indentation, so as to optimize said figure of merit.

The intent is to optimize the figure of merit or achieve at least one of the following:

i) reduction in said drag, ii) reduction in aircraft empty weight, iii) reduction in aircraft operating cost.

Typically, and preferably R over said spanwise extent $S_2$ of the wing decreases progressively away from the fuselage and from a value at or near 4%.

With respect to the wing spanwise extents, it will be noted that:

a) the fuselage has indentation along the wing side thereof, and lengthwise of the fuselage, b) the wing has maximum thickness extending spanwise, said maximum thickness decreasing from a primary wing zone 106 proximate the fuselage indentation to a secondary wing zone 107 at a selected distance 52 from the fuselage centerline, c) the wing maximum thickness to chord ratio, t/c', remaining less than about 2% from said secondary zone 107 to the wing tip 108, wherein C'=local wing chord t=corresponding airfoil maximum thickness and wherein the distance between 107 and 108 is the spanwise distance $S_1$, as indicated in FIG. 10. $S_2$ is about $c/2\beta$ as referred to above.

The graphs of FIGS. 1, 2, 4, and 5 illustrate the relationship between parameters as shown.

Figure 6:
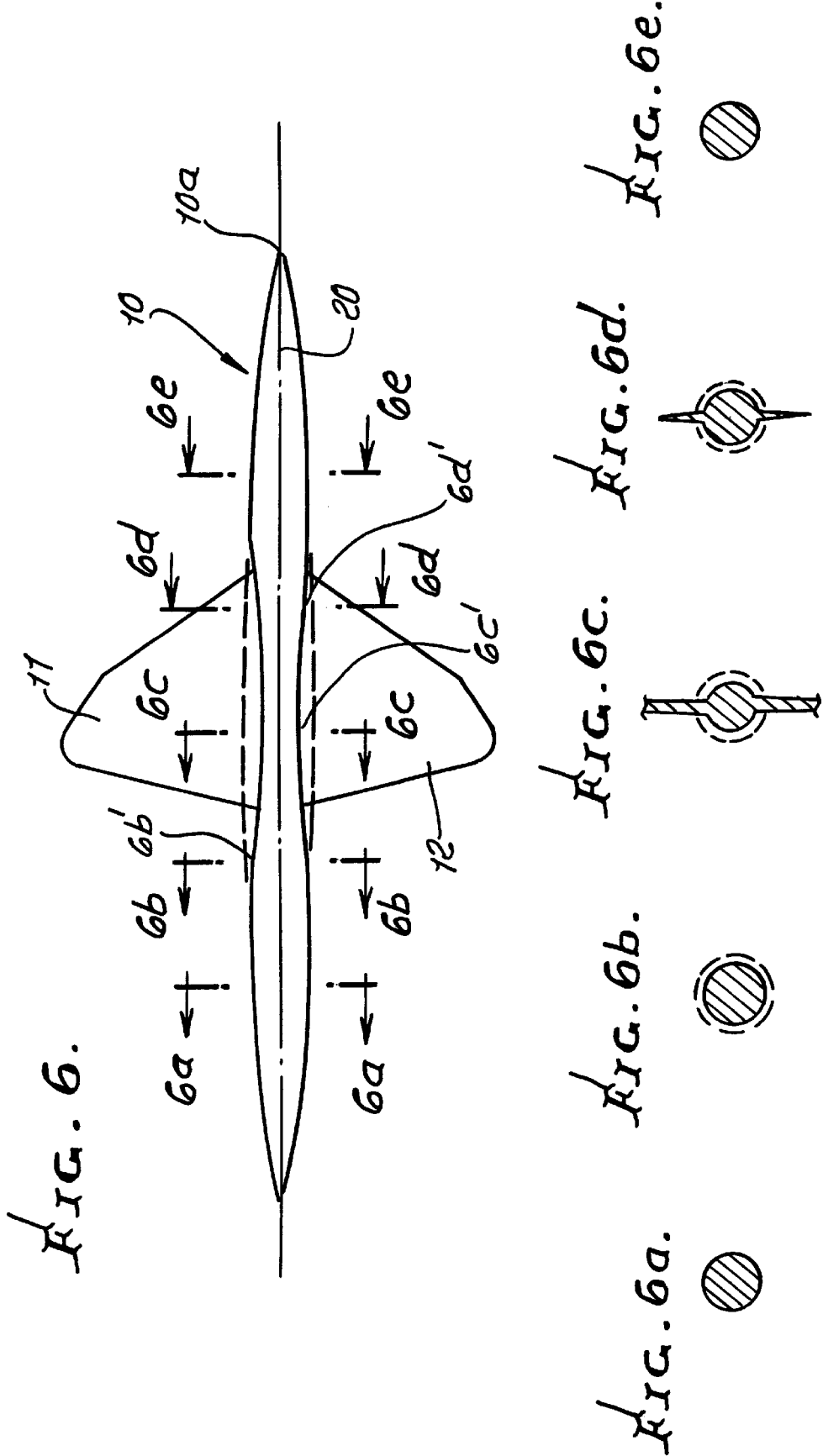
FIG. 6 is a plan view of the wing and body of an aircraft embodying the invention.

FIG. 6 shows an aircraft like that of FIG. 3; and FIGS. 6a–6e show typical fuselage and wing root cross-sections at stations illustrated. Solid lines 6(b)', 6(c)' and 6(d)' show fuselage body indentation at corresponding stations, the broken lines indicating body contour in the absence of indentation.

FIGS. 9(a), 9(b) and 9(c) illustrate examples of various fuselage indentation cross-sections having equal reduction of volume wave drag, as indicated. In FIG. 9(a) the plane of wing 120 intersects the indented (solid line) fuselage 121 abut mid-way between fuselage top and bottom. In FIG. 9(b) the plane of wing 122 intersects the indented (solid line) fuselage 123 at about the top of the fuselage. In FIG. 9(c) the plane of the wing 124 intersects the indented fuselage 125 at near the bottom of the fuselage, and the wing inboard section is faired to the fuselage contour.

It is to be noted that the beneficial effects of fuselage indentation depend primarily on the longitudinal distribution of fuselage cross-section area, and not on the details of the cross-section shape, which may be chosen for other reasons.

Figure 7:
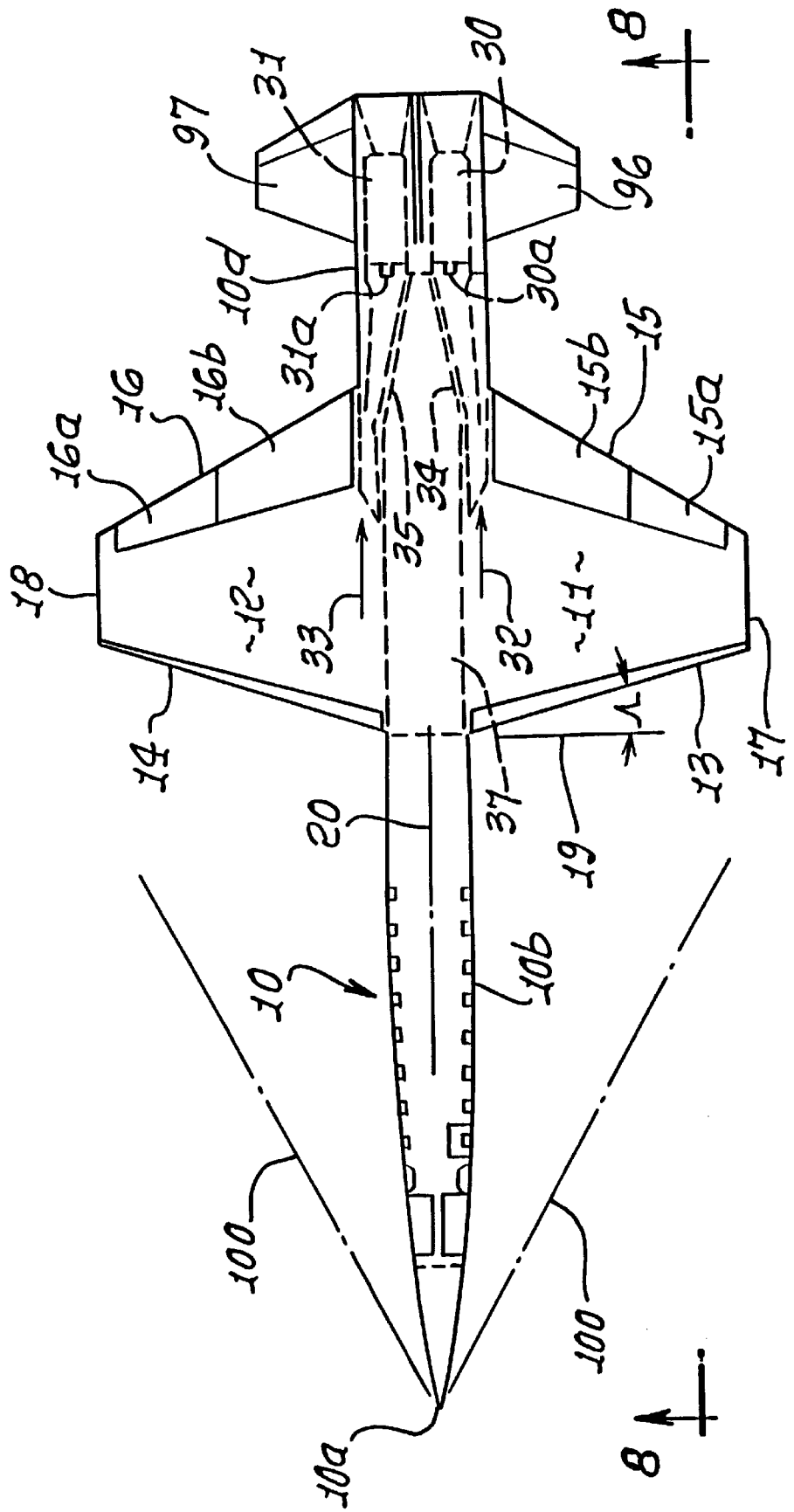
FIG. 7 is a plan view of a supersonic aircraft having an outboard wing in accordance with the present invention.
Figure 8:
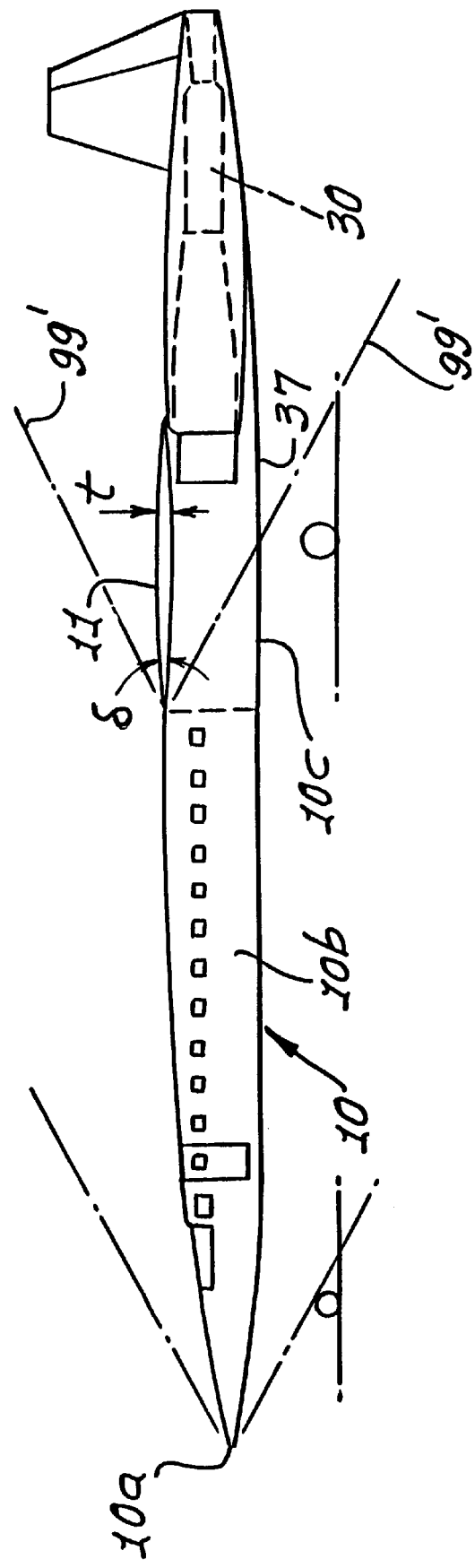
FIG. 8 is an elevation taken on lines 8—8 of FIG. 7.

Referring to FIGS. 7 and 8, they show one example of a supersonic aircraft embodying a wing of the general type disclosed herein. As illustrated, the aircraft includes an elongated fuselage 10 having a sharply pointed forward terminal at 10a, a forward passenger-carrying section 10b, a mid-rear section 10c, and a tail-carrying section 10d which may be widened relative to section 10b to accommodate engines. The aircraft fuselage section associated with section 10c carries left and right wings 11 and 12 incorporating the present invention. The wings have leading edges 13 and 14, trailing edges 15 and 16, and outboard terminal edges 17 and 18. The trailing edges 15 and 16 may be defined by hinged flaps 15a and 15b, and 16a and 16b, as shown. The extreme leading has edge sharpness, δ, and the thickness t of each wing, is maximum adjacent the fuselage.

In this regard, the wing has an associated ratio of maximum airfoil thickness t to local chordal dimension C' of less than 2% as an average, over its spanwise outer extents 11a and 12a. Also, the wing has an associated ratio of maximum thickness-to-chord dimension at or proximate the wing tip, the ratio being less than about 1½%. The maximum limiting value of the angle Ω is further defined as:

Ω≦arc cosine (1/M)

where:

M=Mach number associated with the design cruise speed at said supersonic flight.

The leading edge of each wing is angled rearwardly and laterally relative to a normal 19 to the fuselage longitudinally forwardly extending axis 20, that angle indicated at Ω over outboard wing extents 11a and 12a. The leading edge angle Ω and the sharpness δ are characterized in that at design supersonic cruise flight conditions, the wing has an attached shock wave produced in association with the wing extending generally along or rearwardly of the leading edge, whereby laminar boundary layer conditions are maintained over the leading edge and adjacent the surface of the wing. Typically, the angle Ω is between 0° and 30°. Note the attached shock wave at 99', associated with the wing and originating from the sharp leading edges 13 and 14.

As is clear from FIG. 7, the engine means (engine or engines) are carried by the fuselage, whereby the wing or wings are free of support for the engine means. See in the example the two laterally spaced engines 30 and 31 carried by or within the fuselage section 10d. Their intakes 30a and 31a receive air along paths, as indicated by arrows 32 and 33, outwardly of barriers 34 and 35. In addition, the aircraft has fuel tank means entirely carried by the fuselage, whereby the wing is free of support for the fuel tank means. It is noted that the inner spanwise extent $S_2$ being thicker, could be used beneficially to support fuel tank means, and that for very large aircraft, even the outer spanwise extent $S_1$ could be as well. In the example, the forwardly elongated fuel tank 37 is carried by fuselage sections 10c and 10d, i.e. generally between, or inboard of, the wings, and also forward of the engines.

Also typically provided are leading edge flap means 40 associated with the wing leading edge and supported for downward deployment during subsonic flight, as during landing of the aircraft.

Additional characteristics are as follows:

1) laminar boundary layer conditions can be maintained over a majority of the wing surface;

2) the wing having an associated wave drag due to thickness and skin friction, and the wave drag of which is about the same magnitude as the skin friction drag;

3) supersonic leading and trailing wing edges with fuselage and engine inlet located so that they have minimal adverse effect on the pressures over the majority of the wing surface;

4) wing airfoils having continuous generally convex shape from a sharp leading edge to or near the trailing edge;

5) wing thickness-to-chord ratio as thin as practical (considering structural factors) for strength and stiffness but not greater than about 2% as a spanwise average over outer spanwise extent $S_1$, and less than about 4% over inner spanwise extent $S_2$;

6) wing surface free of roughness, gaps and waviness capable of destabilizing the laminar supersonic boundary layer.

The wing is typically useful on a long-range supersonic aircraft and is configured and located so as to have a minimum drag which is equal to or less than the minimum ideal drag of a delta wing designed for the same purpose.

FIGS. 7 and 8 are representative of a long-range executive jet aircraft, designed for cruise speeds up to about Mach 1.6 at up to 51,000 feet, and a maximum range of about 5,000 nautical miles, with air transport reserves. The range is sufficient for flights from the West Coast of the United States to Tokyo, and is about 150% at the range of the British-French "Concorde" airliner of much larger size and similar speed. Referring to FIGS. 7 and 8, the following additional features are present:

a) longitudinally extended forward fuselage 10 having modified Sears-Haack profile and length-to-diameter ratio of about 20, and carrying fuel, engines and landing gear (note associated shock wave 100 outboard of wing tips);

b) unswept, tapered wing with leading and trailing edge flaps, mounted on top of the indented fuselage tailored for minimum shock wave reflection on the wing and reduced wing-fuselage volume wave drag; and with the engine inlet near the wing trailing edge to limit the extent of wing subject to inlet shock;

c) two-dimensional inlets designed for efficient supersonic pressure recovery;

d) aft fuselage faired into inlets and holding inlet ducts, engines and tail;

e) tail surfaces designed for maximum laminar flow according to the principals disclosed herein;

f) two-dimensional variable area exhaust nozzle.

A leading edge flap is configured to improve subsonic cruise performance as well as maximum lift for takeoff and landing.

Figure 1:
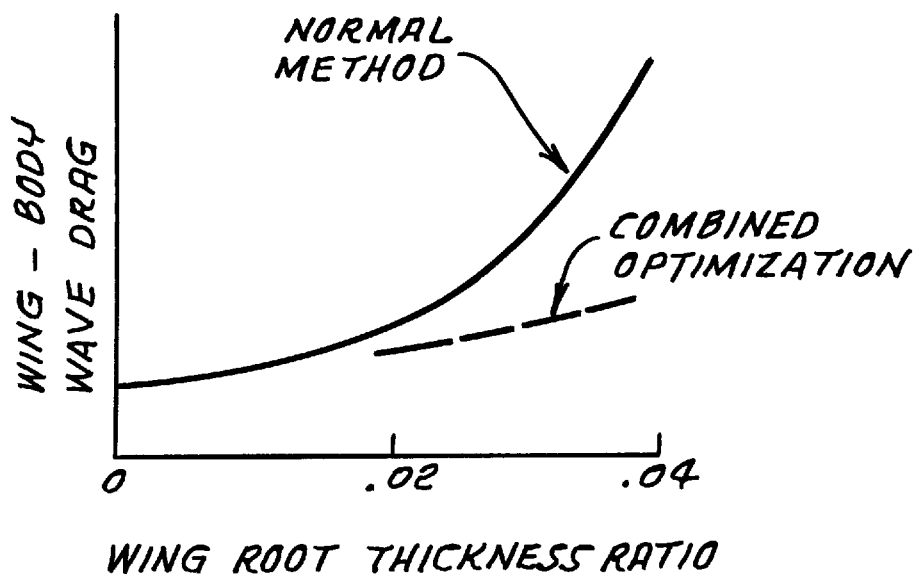
FIG. 1 is a graph showing relationship of wing/body wave drag to wing root thickness ratio.

Comparing the planforms of a representative modified delta wing and a laminar-configured wing or wings, reference is made to FIG. 1 of U.S. Pat. Nos. 5,322,242 or of 5,518,204 that shows Mach lines (dashed), which are characterized by an angle from the flight direction whose trigonometric sine is the reciprocal of the Mach number, (e.g., 30° at Mach 2), and the fact that most of the leading edge of the delta-type wing has greater sweep back than the Mach line. In this case, the component of flow normal to the leading edges 13' and 14' shown in that patent is less than Mach 1, that is, it is subsonic. Hence, the expression "subsonic leading edge" is used to describe this situation.

Conversely, the laminar-configured wing has less sweep back than the Mach line and thus has a "supersonic leading edge", since the component of the flight speed normal to the leading edge is supersonic. The importance of a supersonic leading edge is that, in combination with a suitably sharp leading edge, it permits an attached wing leading edge shock wave, resulting in much lower spanwise pressure gradients and thus minimizes boundary layer cross-flows, which would otherwise strongly destabilize the supersonic laminar boundary layer. By way of contrast, the boundary layer of the delta wing with subsonic leading edges is almost entirely turbulent as the result of the cross-flow induced instability. See edges 90 and 91 in FIG. 1b of U.S. Pat. No. 5,322,242.

Figure 2:
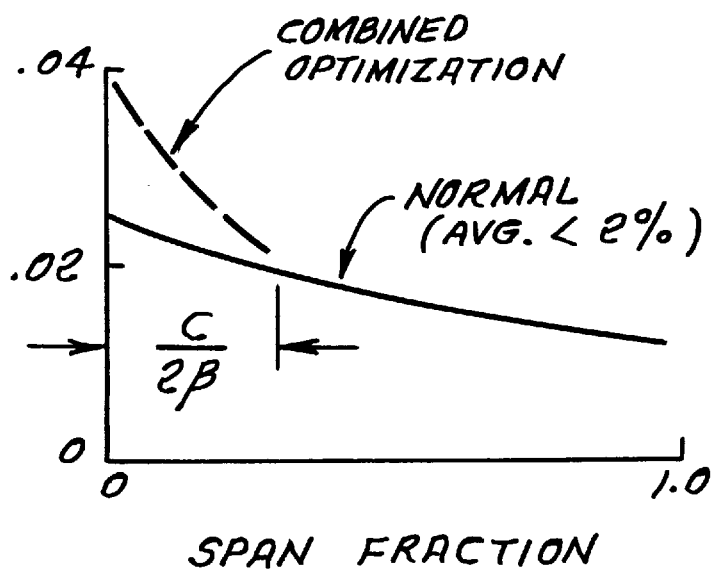
FIG. 2 is a graph showing local thickness to chord ratio versus span fraction.

FIG. 2 of that patent shows the minimum drag as a fraction of lift versus Mach number for two wings. Two drag calculations are shown: the ideal drag of a delta wing shown at (a), and a fairly thick (4%) straight wing shown at (b), typical of earlier designs. The delta calculation neglects drag due to thickness and assumes full leading edge suction thrusts. The straight wing calculation is based on two-dimensional linearized flow theory. In both cases, the boundary layer is assumed to be fully turbulent, typical of prior industry practice, and skin friction is calculated for a chord Reynolds number of 40 million. This figure illustrates the sort of calculation that a designer would make based on prior art, and shows why the straight wing has not been seriously considered previously for efficient supersonic cruise designs, in view of the apparent penalty in drag.

FIG. 3 of that patent shows the minimum drag as a fraction of lift, for a series of laminar-configured wings, versus Mach number. Three thickness ratios are shown to illustrate the effect of thickness, for a fully laminar boundary layer. Also shown for comparison is the drag of a realistic delta wing, based on semi-empirical theory and turbulent skin friction. In all cases, the Reynolds number is taken as $40 \times 10^6$, typical of flight at Mach 1.6 at 51,000 feet altitude with a wing chord of 22 feet. The effect of thickness in increasing the minimum drag is apparent, as is the fact that for thickness ratios less than about 4%, the minimum drag of the laminar-configured wing is less than the minimum drag for a realistic delta wing; and with a thickness of 2% or less, the laminar wing drag is substantially less than the drag of the turbulent delta.

For the laminar-configured case, wave drag due to thickness and lift were calculated according to two-dimensional, linear, supersonic theory as first present by Professor A. Ackeret in 1925. The errors in minimum drag introduced by linear theory for this type of wing configuration can be estimated by comparison with exact oblique shock theory, and are found to be typically from 2% to 5% for angles of interest at most moderate supersonic Mach numbers. Tip effects on minimum drag can be calculated and are found to be of the same magnitude; the tip effect on minimum drag can be reduced or even illuminated by suitable planform design, as shown in FIG. 1 of U.S. Pat. No. 5,322,242 above. Shaded areas 96 in FIG. 1a of that patent show wing areas to be added. See broken line locations of Mach lines.

FIG. 4 of that patent shows the effect of both thickness and extent of laminar boundary layer as a fraction of the wing chord, on the optimum lift-to-drag ratio of the laminar-configured wing at Mach 2. Similar charts correspond to other Mach numbers. Also shown in FIG. 4 of that patent is the value for the lift-to-drag ratio of a realistic turbulent delta wing at the same Mach number, and chord Reynolds number $(40 \times 10^6)$. There is seen to be a wide range of thicknesses and laminar fractions for which the laminar-configured wing has a significantly better lift-to-drag ratio than the turbulent delta.

Figure 5:
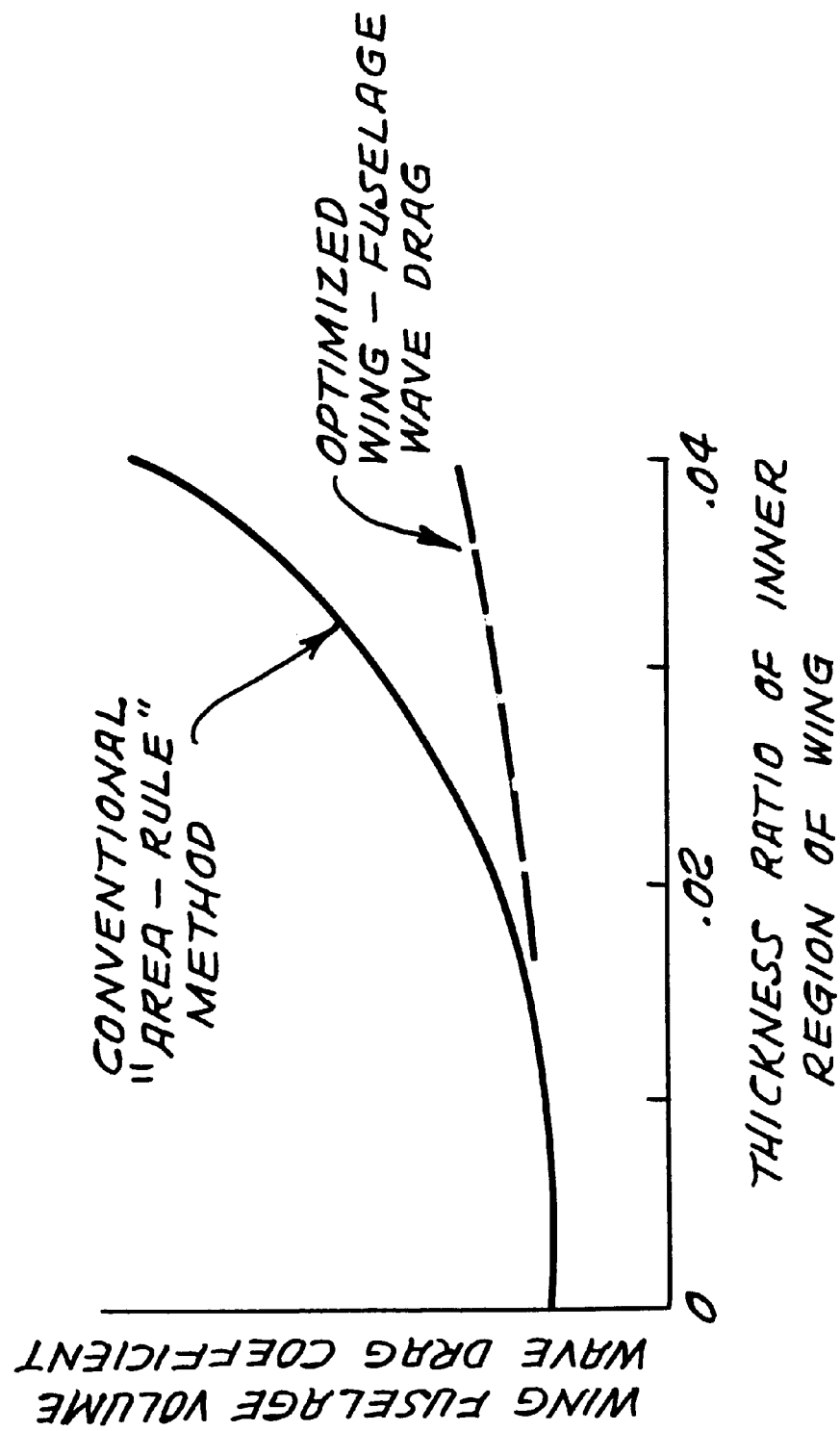
FIG. 5 is a larger graph version of FIG. 1, showing the relationship of wing fuselage volume wave drag coefficient to thickness ratio of inner spanwise region of the wing, i.e. wing region closer to fuselage.

FIG. 5 of that patent compares a recent modified delta-wing supersonic transport design (a) developed by Boeing under a NASA contract, for flight at Mach 2.4, with a laminar-configured design (b) in accordance with the present invention. The transport of the present invention, like the Boeing SST, is designed to hold 247 passengers, and the same amount of fuel. The laminar-configured design is assumed to have the same gross weight as the Boeing design—745,000 lb. The laminar design has a wing and tail thickness of 1.75% at the root and 1.25% at the tip, and wing and tail boundary layer that is assumed to be 80% laminar and 20% turbulent. The wing and tail of the laminar design are assumed to be larger than those of the delta. Similarly, the fuselage is larger to carry the majority of fuel which cannot be carried in the thin wings. Wings 11 and 12 in FIG. 5 (*b*) correspond to those in FIGS. 7 and 8, those figures being found in U.S. Pat. No. 5,518,204.

Despite these differences, the graph of FIG. 6 of that patent shows that the best lift-to-drag ratio of the laminar design is about 25% higher than the Boeing design at Mach 2 and about 28% higher at Mach 1.6, its most economical cruise Mach number. The illustrated level of aerodynamic improvement is approximately enough to make the SST range and cost comparable to present subsonic long-range transports, such as the Boeing 747-400.

Additional benefits of the present invention derive from the reduced sweep and lower design lift coefficient associated with optimum design of the laminar-configured wing, and from the greater freedom to choose aspect ratio without limitations of cruise Mach number as compared to an optimum delta-type wing. The greater aspect ratio and reduced sweep of the laminar design results in lower angles of attack and lower drag during takeoff and landing. Also, because of its lower sweep and more efficient trailing edge flaps, the laminar wing has higher maximum lift resulting in lower takeoff and landing speeds, especially if fitted with leading edge flaps or similar devices.

The lower cruise design lift coefficient of the laminar configuration permits a combination of lower cruise altitude and lower wing loading. The former is important in holding the efficient cruise altitudes below the critical band of risk of ozone damage by engine exhaust emissions. The second means still lower speeds for takeoff and landing, with correspondingly less noise and runway length.

Referring to FIGS. 5 (*b*) and 7, of that patent the lateral tail sections 96 and 97 have substantially the same configurations as the wings 11 and 12.

Figure 9:
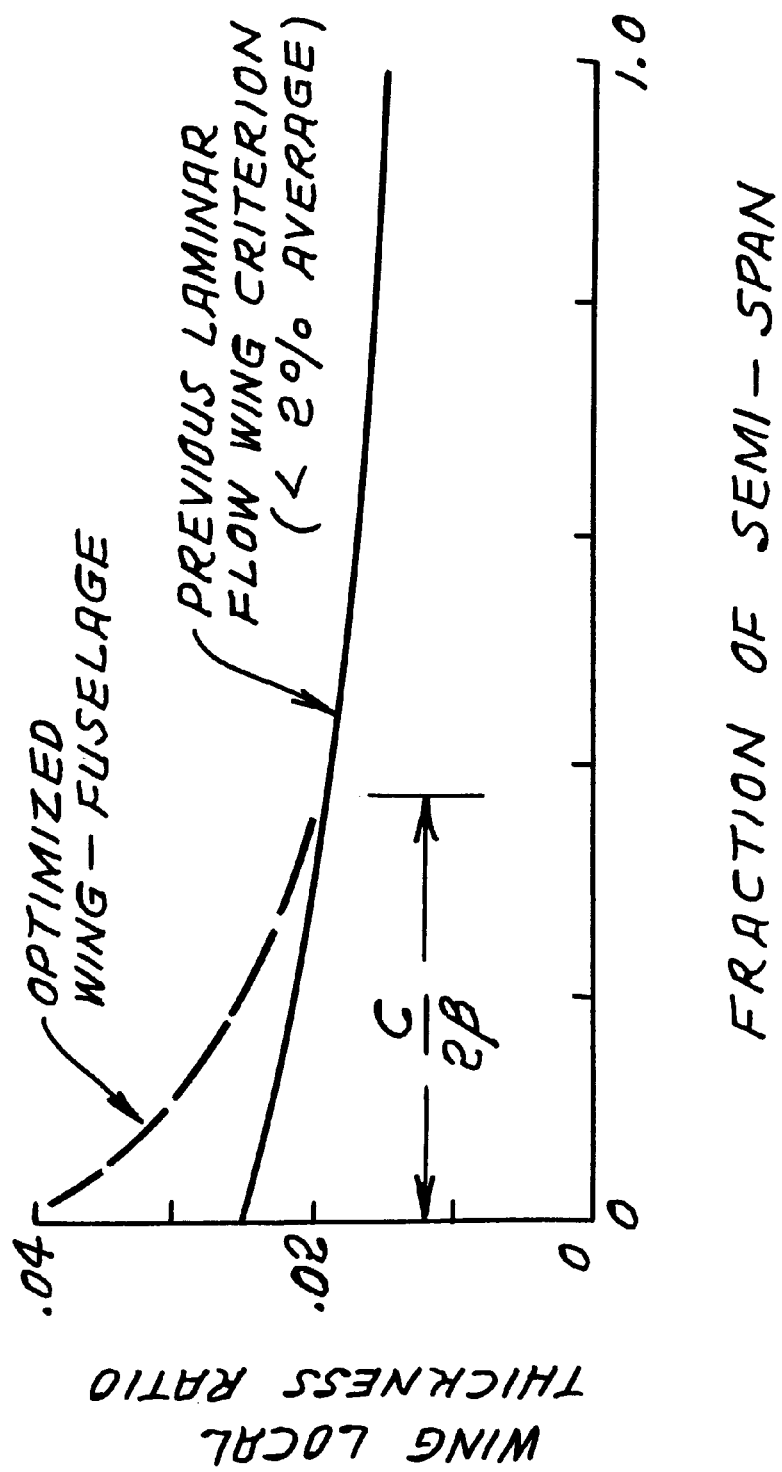
FIGS. 9a–9c are axial frontal elevations of three aircraft embodying the invention and showing examples of various fuselage indentation cross-sections.

The leading edges 13 and 14, as represented by 13' in FIG. 9 (*a*) and (*b*), have sharpness, as defined by angularity δ less than about 5%, between upper and lower surfaces 98 and 99 that taper forwardly. See also the insert in FIG. 4 of that patent where chordal dimension C is shown.

The leading edge, shown deflected in FIG. 10*a* of that patent has several desirable features, including continuously curved surface contours, no gaps or steps, no mechanical actuators, and full strength and stiffness in any position. The deflection of the leading edge 102 through an angle 101 is achieved by causing differential chordwise expansion (or contraction) of the upper and lower skins 104 and 103, respectively, for example by differential heating of the skins. Alternatively, the skins can be made of materials with different thermal coefficients of expansion. These are two examples of methods to induce the desired differential expansion. The skins are supported by a suitable structure, such as the honeycomb 105, which allows the skins to expand in the chordwise direction and has means for heating or cooling the skins. The joint 106 between the leading edge assembly and the main wing structure 107 has no steps or gaps, which could destabilize the laminar boundary layer.

FIG. 10*b* of that patent shows the airfoil contour with the leading edge undeflected, as in supersonic cruise, where the mean line of the airfoil 108 is essentially straight and where there are no excessive steps or gaps at the joint 109 with the main structure.

I claim:

1. A wing in combination with a fuselage which is elongated in the direction of flight, comprising: said wing having a substantially unswept and sharp leading edge, smooth convex chordwise contour over a majority of its surface from the leading edge, and a thickness to chord ratio of about 2% or less as a spanwise average, beyond a spanwise distance from the centerline of not more than about $C/2\beta$ on each side of the body, where $\beta=\sqrt{M^{2-1}}$, M=cruise Mach number, C=centerline wing chord, and wherein the thickness to chord ratio over said spanwise distance is increased substantially over 2%, to benefit strength, stiffness, weight, interior volume, and laminar boundary layer stability, and limited only by the extent to which the increase in volume drag which would otherwise occur is substantially eliminated by the fuselage having indentation proximate the wing, said wing thickening and fuselage indentation being characterized by one of the following:

a) selection of a wing planform airfoil and thickness distribution, the fuselage then indented to accomplish at least one of the following:
  i) reduce the combined volume wave drag relative to combined volume wave drag without such indenting,
  ii) optimize a design figure of merit,
b) selection of a fuselage longitudinal distribution of cross section areas to accomplish one of the following:
  i) the wing thickness then distributed spanwise so as to reduce the combined volume wave drag,
  ii) optimize a design figure of merit,
c) reduction of drag, in accordance with variation in both the fuselage longitudinal distribution of cross section area and wing span wise thickness distribution,
d) optimization of a design figure of merit, in accordance with variation in both the fuselage longitudinal distribution of cross section area and wing spanwise thickness distribution.

2. In supersonic aircraft having a wing, and a fuselage elongated in the direction of flight, the combination comprising a) said wing having a substantially sharp leading edge, and a chordwise extending surface, said surface having a smooth convex chordwise contour over a majority of said surface,
b) said wing having airfoils with thickness dimension to chordwise dimension ratios R which are:
  i) about 2% or less as a spanwise average value, over a first spanwise extent $S_1$ of the wing,
  ii) in excess of 2% as a spanwise average value over a second spanwise extent $S_1$ of the wing,
  iii) where $S_2$ extends from near the fuselage to an intermediate region spanwise along the wing, and $S_1$ extends from near the wing tip to said intermediate region, $S_2$ having a dimension from the fuselage centerline of about $C/2\beta$, where:
    C==wing chord at centerline,
    $\beta=\sqrt{M^{2-1}}$
    M=cruise Mach number,
c) and wherein said ratios R, over said $S_2$ spanwise extent, are sufficient to provide at least one of the following as an improvement over ratios of less than about 2%:
  $x_1$) increased wing strength
  $x_2$) increased wing stiffness
  $x_3$) reduced wing weight
  $x_4$) increased wing interior volume
  $x_5$) enhanced air flow laminar boundary layer stability, over the wing
d) and wherein said fuselage has cross-section area indentation distributed along the intersection of the wing and fuselage, to provide desirably low values of volume wave drag attributable to air flow over the fuselage and wing.

3. The combination of claim 2 wherein said ratios R, over said $S_2$ spanwise extent, are sufficient to provide at least two of $x_1$), $x_2$), $x_3$), $x_4$) and $x_5$).

4. The combination of claim 2 wherein said ratios R, over said $S_2$ spanwise extent, are sufficient to provide all of $x_1$), $X_2$), $x_3$), $x_4$) and $x_5$).

5. A method of providing an improved wing as defined in claim 2, which includes the steps:
   $y_1$) selecting a wing planform and airfoil, and
   $y_2$) adjusting said indentation to reduce said drag.

6. The method of providing an improved wing as defined in claim 2, which includes the steps
   $y_1$) selecting a lengthwise distribution of fuselage cross-section areas in upright planes which intersect said indentation, and
   $y_2$) then distributing wing thickness values spanwise over said $S_2$ spanwise extent, in relation to said areas so as to achieve a desirable reduction of said drag, and optimize a design figure of merit,
   $y_3$) said wing thickness values selected to provide thickness to chord ratios substantially in excess of 2%.

7. The method of providing an improved wing as defined in claim 2, which includes the steps
   $y_1$) selecting a fuselage lengthwise distribution of cross-section areas in upright planes which intersect said indentation, and
   $y_2$) and selecting wing thickness values spanwise over said $S_1$ spanwise extent, so as to achieve at least one of the following:
      iv) a desirably low value of said drag,
      v) a desirably low value of wing and fuselage overall weight
      vi) a desirably low value of fuel consumption over a specified range.

8. The method of claim 2 wherein R over said spanwise extent of the wing decreases away from the fuselage and from a value at or near 4%.

9. In combination, an aircraft wing and fuselage, comprising
   a) said fuselage having indentation along the wing side thereof, and lengthwise of the fuselage,
   b) said wing having maximum thickness extending spanwise, said maximum thickness decreasing from a primary wing zone proximate the fuselage indentation to a secondary wing zone at a selected distance from the fuselage centerline,
   c) said maximum thickness to chord ratio, t/c' remaining less than about 2% from said secondary zone to the wing tip, wherein
      C'=local wing chord
      t=corresponding airfoil maximum thickness.

10. The combination of claim 9 wherein said selected distance is about $C/2\beta$ where:
    $\beta = \sqrt{M^2-1}$
    M=cruise Mach number
    C=centerline wing chord.

11. The combination of claim 9 wherein the fuselage has top and bottom regions, and said wing extends into proximity to the fuselage at one of the following locations:
    i) substantially mid-way between said top and bottom regions,
    ii) closer to said top region than to said bottom region,
    iii) closer to said bottom region than to said top regions.

12. The combination of claim 11 wherein said indentation extends substantially about the fuselage at fuselage longitudinally spaced stations.

13. The combination of claim 11 wherein the wing thickness increases in a direction toward the fuselage to merge with fuselage curvature.

14. A wing for use on an airplane designed for efficient supersonic flight, said wing having leading and trailing edges, a longitudinal axis extending directionally between said edges wing tip ends and upper and lower surfaces, said wing having a main portion and tip portion:
    a) said main portion of the wing having leading edge sweep angularity $\Omega$, wherein said leading edge sweep angularity at any spanwise location is defined as the angle between the tangent to the leading edge of said wing at said location, and the plane normal to the longitudinal axis of said airplane,
    b) the wing having leading edge sharpness $\delta$ defined by upper and lower wing surfaces which taper toward said leading edge to define an angle closely proximate said leading edge, and which is less than about 5 degrees, as an average along the major length of the span,
    c) the wing having an airfoil cross sectional shape at each spanwise location, defined by the intersections of said upper and lower surfaces with a vertical plane parallel to said longitudinal axis at said spanwise location, said airfoil cross sectional shape being free from concavity for the majority of its longitudinal length measured form said leading edge,
    d) and wherein the absolute value of the leading edge sweep angularity satisfies the expression $\Omega \leq$ arc cosine $(1/M_L)$ wherein $M_L$ is defined as the lowest Mach number of the supersonic cruise flight envelope of said airplane.

15. A wing for use on an airplane designed for efficient supersonic flight, said wing having leading and trailing edges, a longitudinal axis extending directionally between said edges wing tip ends and upper and lower surfaces, said wing having a main portion and a tip portion:
    a) said main portion of the swing having leading edge sweep angularity $\Omega$, wherein said leading edge sweep angularity at any spanwise location is defined as the angle between the tangent to the leading edge of said wing at said location, and the plane normal to the longitudinal axis of said airplane,
    b) the wing having leading edge sharpness $\delta$ defined by upper and lower wing surfaces which taper toward said leading edge to define an angle closely proximate said leading edge, and which is less than about 5 degrees, as an average along the major length of the span,
    c) the wing having an airfoil cross sectional shape at each spanwise location, defined by the intersections of said upper and lower surfaces with a vertical plane parallel to said longitudinal axis at said spanwise location, said airfoil cross sectional shape being free from concavity for the majority of its longitudinal length measured from said leading edge,
    d) said wing having airfoils with thickness dimension to chordwise dimension ratios $\tau$ wherein $\tau$ over the spanwise extent of the wing decreases away from the fuselage and from a value less than about 4%.
    e) and wherein the absolute value of the leading edge sweep angularity satisfies the expressions $\Omega \leq$ arc cosine $(1/M_L)$ wherein $M_L$ is defined as the lowest Mach number of the supersonic cruise flight envelope of said airplane.

16. In a supersonic flight aircraft having a longitudinally forwardly extending fuselage having an axis in the direction of flight, and wing, the combination comprising:

a) said wing extending generally laterally relative to said axis, and having a leading edge angled forward or rearwardly relative to a normal to said axis at an angle $\Omega$, said wing having a leading edge sharpness $\delta$ defined by upper and lower wing surfaces, which taper toward the leading edge to define an angle $\delta$, closely proximate the leading edge at all spanwise locations, b) said angle $\Omega$ and sharpness $\delta$ characterized in that at design supersonic cruise flight conditions, said wing has an attached shock wave, that is the forwardmost shock wave produced in association with said wing extending generally along or rearwardly of said leading edge, whereby laminar boundary layer conditions are maintained over said leading edge and adjacent the surface of the wing, c) said wing having airfoils with thickness dimension to chordwise dimension ratios $\tau$, wherein $\tau$ over spanwise extent of the wing decreases away from the fuselage and from a value of less than about 3.0%.

17. In a supersonic flight aircraft having a longitudinally forwardly extending fuselage having an axis in the direction of flight, and a wing, the combination comprising:

a) said wing extending generally laterally relative to said axis, and having a leading edge angled forwardly or rearwardly relative to a normal to said axis at an angle $\Omega$, and said wing having a leading edge sharpness defined by upper and lower wing surfaces, which taper toward the leading edge to define an angle $\delta$ closely proximate the leading edge at all spanwise locations, said angle $\delta$ being less then about 5 degrees, b) said angle $\Omega$ and sharpness $\delta$ characterized in that at design supersonic cruise flight conditions, said wing has an attached shock wave, that is the forwardmost shock wave produced in association with said wing extending generally along or rearwardly of said leading edge, whereby laminar boundary layer conditions are maintained over the said leading edge and adjacent the surface of the wing.

\* \* \* \* \*